(12) United States Patent
Hotta et al.

(10) Patent No.: US 9,254,871 B2
(45) Date of Patent: Feb. 9, 2016

(54) VEHICULAR INSTRUMENT-MOUNTING STRUCTURE

(75) Inventors: Koji Hotta, Miyoshi (JP); Kenshi Yamanaka, Nukata-gun (JP); Yutaka Hotta, Chiryu (JP)

(73) Assignees: TOYOTA JIDOSHA KABUSHIKI KAISHA, Aichi-ken (JP); AISIN AW CO., LTD., Aichi-ken (JP)

( * ) Notice: Subject to any disclaimer, the term of this patent is extended or adjusted under 35 U.S.C. 154(b) by 0 days.

(21) Appl. No.: 13/995,387

(22) PCT Filed: Feb. 13, 2012

(86) PCT No.: PCT/JP2012/053232
§ 371 (c)(1),
(2), (4) Date: Jun. 18, 2013

(87) PCT Pub. No.: WO2012/111591
PCT Pub. Date: Aug. 23, 2012

(65) Prior Publication Data
US 2013/0270862 A1    Oct. 17, 2013

(30) Foreign Application Priority Data
Feb. 14, 2011 (JP) .................. 2011-028363

(51) Int. Cl.
*B60K 1/00* (2006.01)
*B62D 27/00* (2006.01)
(Continued)

(52) U.S. Cl.
CPC .............. *B62D 21/155* (2013.01); *B60K 1/00* (2013.01); *B60R 16/04* (2013.01); *B60Y 2200/92* (2013.01); *B60Y 2306/01* (2013.01)

(58) Field of Classification Search
CPC .......... B60R 19/52; B60R 16/04; B60K 1/00; B60K 1/02; B60K 1/04; B60L 15/007; B60L 3/003; B60L 3/0046; B60L 3/0084
USPC ....................... 180/232, 68.5, 68.6
See application file for complete search history.

(56) References Cited

U.S. PATENT DOCUMENTS 6,460,642 B1 * 10/2002 Hirano ................. 180/65.1
6,827,168 B2 * 12/2004 Miyazaki ................ 180/68.5
(Continued)

FOREIGN PATENT DOCUMENTS

JP    2001-354040 A    12/2001
JP    2002-362254 A    12/2002
(Continued)

OTHER PUBLICATIONS

International Search Report for PCT/JP2012/053232, dated Apr. 17, 2012.

*Primary Examiner* — Joseph Rocca
*Assistant Examiner* — Travis Coolman
(74) *Attorney, Agent, or Firm* — Sughrue Mion, PLLC

(57) ABSTRACT

The present invention comprises side members (15), which are vehicular skeleton members of a hybrid vehicle (10); a front cross member (18) for connecting the two side members (15); spring supports (16) connected to the side members (15); an auxiliary battery arranged further towards the vehicle front relative to a PCU (13) and attached to the front cross member (18) via a support platform (23) and a securing piece (22); a radiator (17) attached to the front cross member (18); a motor case (12) and an engine (11) connected to the vehicular skeleton member via an engine mount; an axle (25) extending from the motor case (12); and a PCU (13) connected to the motor case (12) via a guide plate (19) and a linkage bolt. Thus, there is provided a vehicular instrument-mounting structure capable of inhibiting collision of a power control device or other vehicle-mounted instrument with another member, and inhibiting damage caused to the power control device or other vehicle-mounted instrument during a vehicle collision.

6 Claims, 8 Drawing Sheets

(51) Int. Cl.
  *B62D 21/15*     (2006.01)
  *B60R 16/04*     (2006.01)

(56) References Cited

U.S. PATENT DOCUMENTS

| | | | |
|---|---|---|---|
| 7,485,983 B2 * | 2/2009 | Asao et al. | 307/10.1 |
| 7,561,445 B2 * | 7/2009 | Yajima et al. | 361/826 |
| 7,802,643 B2 * | 9/2010 | Yajima | 180/65.22 |
| 7,913,786 B2 * | 3/2011 | Voigt et al. | 180/68.5 |
| 8,011,467 B2 * | 9/2011 | Asao et al. | 180/68.5 |
| 8,037,960 B2 * | 10/2011 | Kiya | 180/68.5 |
| 8,172,019 B2 * | 5/2012 | Takeda | 180/65.31 |
| 8,302,716 B2 * | 11/2012 | Yoda | 180/68.5 |
| 8,336,657 B2 * | 12/2012 | Dobbins et al. | 180/68.5 |
| 8,395,047 B2 * | 3/2013 | Adachi et al. | 174/74 R |
| 8,459,399 B2 * | 6/2013 | Ohashi | 180/312 |
| 8,479,858 B2 * | 7/2013 | Kodaira | 180/68.5 |
| 8,485,292 B2 * | 7/2013 | Wakatsuki | 180/65.22 |
| 8,698,347 B2 * | 4/2014 | Ishigaki | 307/9.1 |
| 2002/0191385 A1 | 12/2002 | Miyazaki | |
| 2005/0205316 A1 * | 9/2005 | Yamafuji | 180/68.5 |
| 2007/0115707 A1 * | 5/2007 | Koide | F04B 35/04 |
| | | | 363/146 |
| 2009/0014221 A1 * | 1/2009 | Kim | B60K 1/04 |
| | | | 180/65.1 |
| 2010/0025131 A1 * | 2/2010 | Gloceri et al. | 180/65.28 |
| 2010/0116571 A1 * | 5/2010 | Suzuki | B60L 11/1877 |
| | | | 180/65.25 |
| 2010/0127602 A1 * | 5/2010 | Rueggen | H02K 11/0073 |
| | | | 310/68 D |
| 2012/0304790 A1 * | 12/2012 | Bologna | 74/331 |

FOREIGN PATENT DOCUMENTS

| | | |
|---|---|---|
| JP | 2009-040263 A | 2/2009 |
| JP | 2009-090818 A | 4/2009 |
| JP | 2010-004139 A | 1/2010 |
| JP | 2010-151261 A | 7/2010 |
| JP | 2010-158991 A | 7/2010 |
| JP | 2010-264793 A | 11/2010 |

* cited by examiner

VEHICULAR INSTRUMENT-MOUNTING STRUCTURE

CROSS REFERENCE TO RELATED APPLICATIONS

This application is a National Stage of International Application No. PCT/JP2012/053232 filed Feb. 13, 2012, claiming priority based on Japanese Patent Application No. 2011-028363 filed Feb. 14, 2011, the contents of all of which are incorporated herein by reference in their entirety.

TECHNICAL FIELD

The present invention relates to a vehicular instrument-mounting structure, in which a motor case that stores therein an electric rotating machine for driving a vehicle is disposed in a section formed towards a forward side with respect to a vehicle interior, and a power control device which performs control of the electric rotating machine and an auxiliary battery which supplies electric power to a control section of the power control device are mounted.

BACKGROUND ART

Conventionally, electric vehicles that are driven by a driving force of an electric rotating machine such as a motor generator, hybrid vehicles in which an engine which is an internal combustion engine and an electric rotating machine are used in combination, fuel cell vehicles that driven by electric power generated by a fuel cell, and the like have been known. These vehicles include a power control device having a boost converter, an inverter, and so on, that receives electric power supplied from a main battery or a fuel cell and controls electric power to a motor generator (hereinafter also referred to as a "motor").

The power control device is also referred to as a PCU (power control unit). As the PCU deals with high voltage and high current, it is necessary to mount the PCU in an engine compartment near the motor generator. Accordingly, in a hybrid vehicle in which an engine is started by a motor generator, because an auxiliary battery for starting the engine does not supply electric power to a cell motor and therefore need not be placed near the engine, and in order to maximize space for disposing the PCU in the engine compartment, the auxiliary battery is disposed in a luggage compartment.

In recent years, with advancements in downsizing of high-voltage instruments, it has become possible to place the auxiliary battery within the engine compartment and near the power control device. For example, Patent Document 1 discloses technology of fixing, on a transaxle (also referred to as a motor case) which includes a first motor generator forming a twin-shaft, a second motor generator arranged parallel to an axial line of the first motor generator, and a differential gear arranged on a third axial line parallel to the twin-shaft, a power control device that drives the first motor generator and the second motor generator, which is achieved by downsizing the power control device. With the use of this technology, it is possible to realize downsizing of the power control device and simplification of wiring.

However, in a case in which an auxiliary battery is disposed near a power control device, it is necessary to avoid interference between the auxiliary battery and the power control device in order to perform protection and rapid discharge of the power control device smoothly at the time of vehicle collision in accordance with the regulations for at the time of collision (FMVSS305: Federal Motor Vehicle Safety Standard) of the National Highway Traffic Safety Administration (NHTSA) of the Department of Transportation in the United States. Accordingly, Patent Document 2 discloses a structure having a disengagement mechanism in which, at the time of vehicle collision, due to a load transmitted from an auxiliary battery via a guide surface, which is caused by backward movement of the auxiliary battery with the intrusion of a barrier (obstacle), a relay box moves upward and is separated from a vehicle body. With this mechanism, the battery moves backward smoothly. With such a disengagement structure of the relay box, it is possible to prevent interference between the vehicular instruments and other members that would move as a result of a collision impact and to thereby enhance the impact absorbing effect.

Further, while the auxiliary battery has a relatively low voltage of 12 volts and therefore damages caused by breakage are not significant, it is desired that damages to the power control device that controls a high voltage such as several hundred volts should be minimized. Accordingly, Patent Document 3 discloses an instrument-mounting structure in which, in order to protect the power control device itself at the time of vehicle collision, the power control device is mounted such that the front end of the power control device is located further toward the vehicle's rear side with respect to the front end of the transaxle and a motor compressor is placed toward the vehicle's rear side with respect to the power control device, and the auxiliary battery is mounted at the same position of the power control device thereby facilitating protection of the auxiliary battery.

Further, Patent Document 4 discloses an inverter disengagement mechanism which, in order to protect a power control device itself such as an inverter, causes the inverter and an inverter bracket to be disengaged from an inverter tray attached to a front member when an external force is applied to the inverter at the time of collision.

PRIOR ART DOCUMENTS

Patent Documents

Patent Document 1: JP 2001-354040 A
Patent Document 2: JP 2002-362254 A
Patent Document 3: JP 2010-158991 A
Patent Document 4: JP 2009-90818 A

DISCLOSURE OF THE INVENTION

Technical Problems

While Patent Document 1 and Patent Document 3 described above disclose technology of fixing the power control device on the transaxle, in a layout in which an auxiliary battery is mounted toward the vehicle's front side with respect to the power control device in relation to other instruments, a corner portion of the auxiliary battery having a relatively high strength partially contacts the power control device to thereby generate a reactive force in a casing of the power control device. When this reactive force exceeds the rigidity of the casing of the power control device, a circuit within the power control device breaks. With such a layout, there are cases in which rapid discharge by using the circuit within the power control device at the time of collision becomes difficult.

Accordingly, in order to protect a circuit within the power control device, it can be considered to increase the rigidity of the casing of the power control device so as to exceed the reactive force generated when the casing is squeezed by the auxiliary battery, or to cause the reactive force to escape by disengaging the power control device from the transaxle at the time of collision, as described in Patent Document 2. However, in the former case, it is necessary to increase the thickness of the plate in order to reinforce the casing rigidity of the power control device, which results in an increase in costs, weight, and physical size, of the power control device. Further, in the latter case, as it is necessary to mount the power control device on the structure member of the vehicle along with the disengagement structure, a limitation in the mounting space arises.

Accordingly, it is an object of the present invention to provide a vehicular instrument-mounting which is capable of suppressing an impact of an in-vehicle instrument such as a power control device with other members at the time of collision of a vehicle, to thereby suppress damage to the in-vehicle instrument such as the power control device.

Solution to Problems

In order to achieve the above object, in accordance with an aspect of the present invention, there is provided a vehicular instrument-mounting structure, in which, in a section formed towards a forward side with respect to a vehicle interior, a motor case that stores therein an electric rotating machine for driving a vehicle is disposed, and a power control device which performs control of the electric rotating machine and an auxiliary battery which supplies electric power to a control section of the power control device are mounted, the vehicular instrument-mounting structure including a guide member for guiding the power control device toward the rear side of the vehicle, and a linkage member for coupling the guide member with an upper surface of the motor case, wherein the linkage member releases linkage between the motor case and the guide member when an impact load is applied to the power control device, with the auxiliary battery being disposed toward the front side of the vehicle with respect to the power control device, and supported such that the auxiliary battery pushes the power control device movably toward the rear side of the vehicle while the auxiliary battery is moved toward the rear side of the vehicle due to the impact load.

Further, in the vehicular instrument-mounting structure according to the present invention, the auxiliary battery is disposed such that a rear-most end portion of the auxiliary battery is located toward the rear side of the vehicle with respect to a front-most end portion of the power control device.

Also, in the vehicular instrument-mounting structure according to the present invention, the auxiliary battery is disposed such that a portion of the auxiliary battery is located toward the lateral side with respect to the power control device.

Furthermore, in the vehicular instrument-mounting structure according to the present invention, a direction of disengagement of the power control device is specified to one direction by the guide member and the linkage member.

Further, in the vehicular instrument-mounting structure according to the present invention, the auxiliary battery is mounted on a vehicular skeleton member that absorbs the impact load by being crushed in a crush direction.

Still further, in the vehicular instrument-mounting structure according to the present invention, the motor case is a twin-shaft transaxle having two electrical rotary machines.

Advantageous Effects of Invention

With the application of the vehicular instrument-mounting structure according to the present invention, because, while an auxiliary battery is mounted in a space formed toward the forward direction with respect to a transaxle, which is secured by mounting the power control device on the transaxle, a reactive force generated in the power control device by being pushed by the auxiliary battery at the time of collision can be absorbed due to disengagement of the power control device, it is possible to speedily discharge the electric charge of high voltage by using a circuit within the power control device. As this vehicular instrument-mounting structure can obviate the disadvantages caused by collision even when the auxiliary battery is placed on the forward side with respect to the power control device, there are provided advantages that the degree of freedom is high for the layout of the engine compartment and that, in vehicles of various sizes and types, realization of both mounting of the auxiliary battery within an engine compartment and collision safety can be achieved. There is a further advantage that realization of both cost reduction and collision safety can be achieved.

EMBODIMENTS OF THE INVENTION

A best mode for implementing the present invention (which will be referred to as an embodiment) will be described with reference to the drawings.

Figure 1:
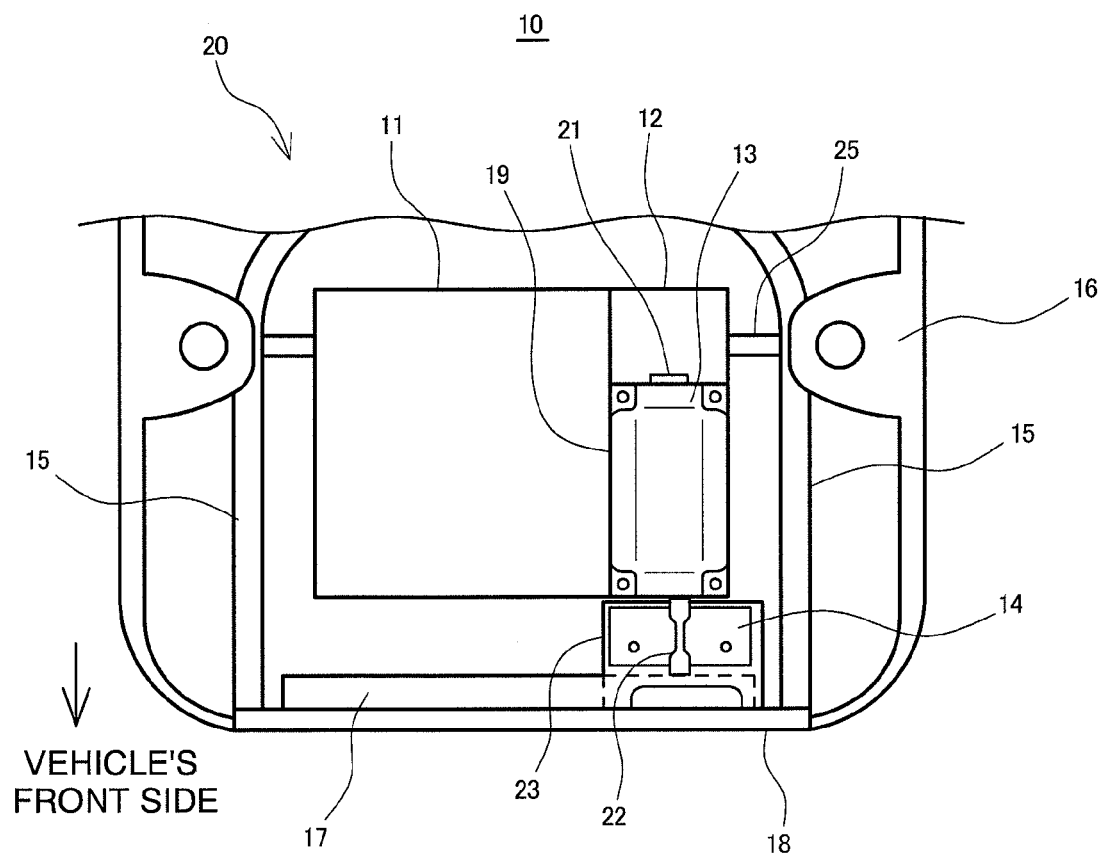
FIG. 1
Schematic view schematically illustrating a vehicular instrument-mounting structure within an engine compartment according to an embodiment of the present invention.

FIG. 1 illustrates an overview of a vehicular instrument-mounting structure within an engine compartment 20 in a hybrid vehicle 10. With reference to FIG. 1, the vehicular instrument-mounting structure will be generally discussed. The engine compartment 20 is located toward the front side of the hybrid vehicle 10 with respect to a passenger compartment. The engine compartment 20 includes side members 15 which are vehicular skeleton members of the hybrid vehicle 10, a front cross member 18 for connecting the two side members 15, spring supports 16 connected to the side members 15, an auxiliary battery 14 which is disposed further toward the front side of the vehicle with respect to a PCU 13 and is attached to the front cross member 18 via a support platform 23 and a securing piece 22, a radiator 17 which is attached to the front cross member 18, an engine 11 and a motor case 12 connected to the vehicular skeleton member via an engine mount, an axle 25 extending from the motor case 12, and the PCU 13 connected to the motor case 12 via a guide plate 19 and a linkage bolt. Further, the PCU 13 includes a boost converter for boosting the voltage of a main battery, an inverter for controlling a boosting coil and a motor generator, and a capacitor for smoothing. Also, a male connector 21 engaging with a female connector of the motor case 12 and a cable connected to the main battery are provided toward the rear side of the vehicle with respect to the PCU 13.

One of the characteristic features of the present embodiment is to disengageably mount the PCU 13 in a region having a depth formed by a twin-shaft type motor case with the guide plate 19 by using an impact load and to dispose the auxiliary battery 14 toward the front side of the vehicle with respect to the PCU 13. While in the conventional mounting structure a disengagement structure is provided on the vehicular skeleton member such as the front cross member to support the PCU in a disengageable manner, with the disengagement structure being mounted on the PCU 13 as in the present embodiment, it is possible to moderate the restrictions for mounting. With such an arrangement, because, while the auxiliary battery 14 is disposed toward the forward side with respect to the PCU 13, the PCU 13 itself can absorb the impact load by being disengaged at the time of collision, it is possible to speedily discharge the high voltage electric charge in the inverter and the boost converter of the PCU 13 by using an internal circuit of the PCU 13.

Figure 2:
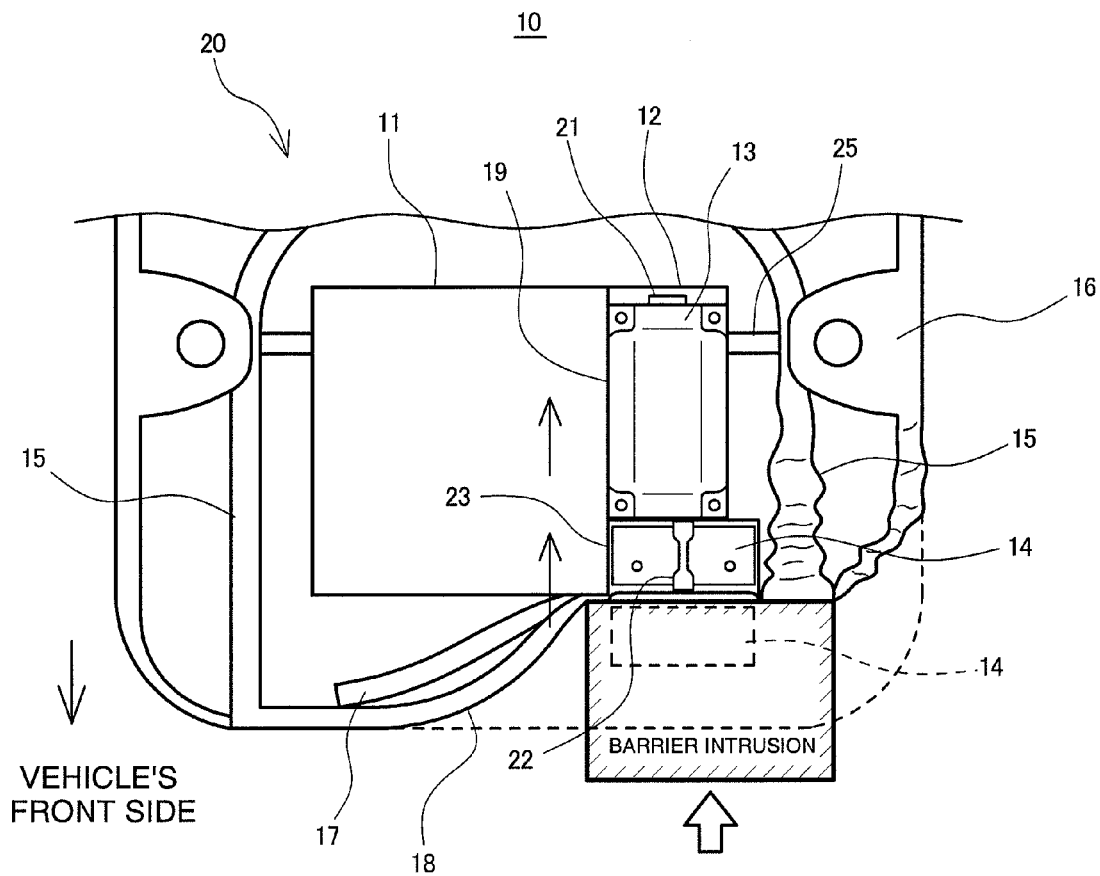
FIG. 2
Top view illustrating, from above, a deformation of the engine compartment illustrated in FIG. 1, when a barrier intrudes from the vehicle's front side.

FIG. 2 is a top view illustrating a deformation of the engine compartment 20 when a barrier intrudes into the hybrid vehicle 10 of FIG. 1 from the vehicle's front side with respect to the engine compartment 20 and right half portion of the vehicle (offset collision). With reference to FIG. 2, the safety processing for dealing with a collision with a barrier will be described in detail in four separate stages.

The first stage is a stage of initial collision, in which the barrier comes in contact with the front cross member 18, and the radiator 17 and the auxiliary battery 14 attached to the support platform 23 with the securing piece are pushed into the engine compartment 20 by the barrier.

The second stage is an impact absorption start stage, in which the front cross member 18 which is squeezed by the barrier transmits the impact load to the side member 15, and the side member 15 and peripheral members of the side member 15 are crushed to thereby absorb the impact load. In the case of a relatively small collision, the intrusion of the barrier may be stopped at this stage.

The third stage is a disengagement stage of the PCU 13 when the barrier further intrudes. The auxiliary battery 14 which is squeezed by the barrier comes into contact with a front surface of the PCU 13 and squeezes the PCU 13 toward the vehicle's rear side. With the squeezing of the PCU 13, linkage between the PCU 13 and the motor case 12 by a linkage means is released so that the PCU 13 disengages from the motor case and moves toward the backward side of the vehicle.

The fourth stage concerns safety processing of the PCU 13 after disengagement. When the PCU 13 judges a collision from an air bag or an instruction from a host controller, the host controller or the PCU 13 stops supply of electric power from the main battery to the inverter and the converter, and also the PCU 13 discharges the electric charge of the boost converter, the smoothing capacitor, and the like, by using the internal circuit of the inverter, thereby securing safety.

According to the structure of the present embodiment, the power cable which is connected from the main battery to the PCU 13 is allowed to have an extra length, corresponding to the disengagement at the time of collision, to maintain connection, and, concerning the connection from the PCU 13 to the motor generator, connection between the male connector 21 and the female connector 31 is released with the disengagement of the PCU 13. Here, while the connectors are used in the present embodiment, it is a matter of course that a short generator cable which is broken safely or an isolation terminal block connected with a bus bar whose joint portion is disconnected safely may also be used.

Figure 3:
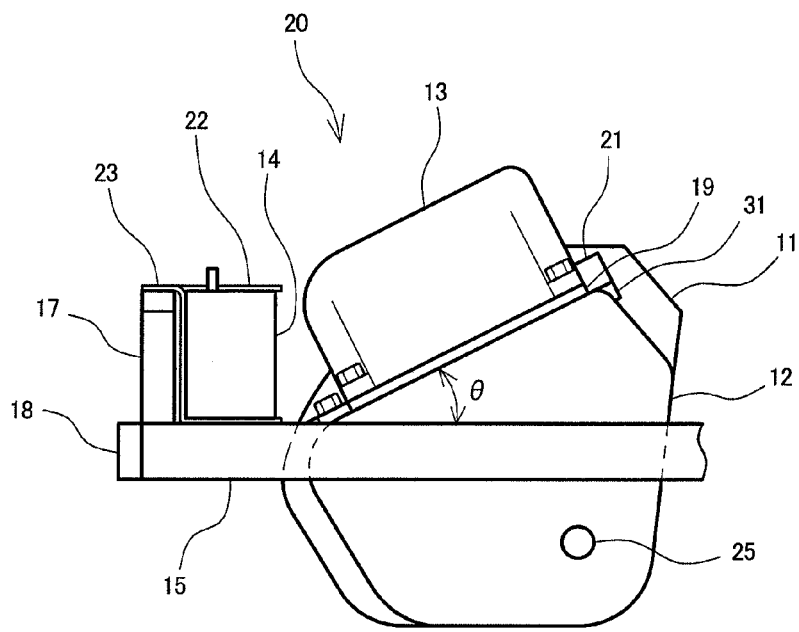
FIG. 3
Side views illustrating, from a lateral side, a deformation of the engine compartment illustrated in FIG. 1, when a barrier intrudes from the vehicle's front side.
Figure 3:
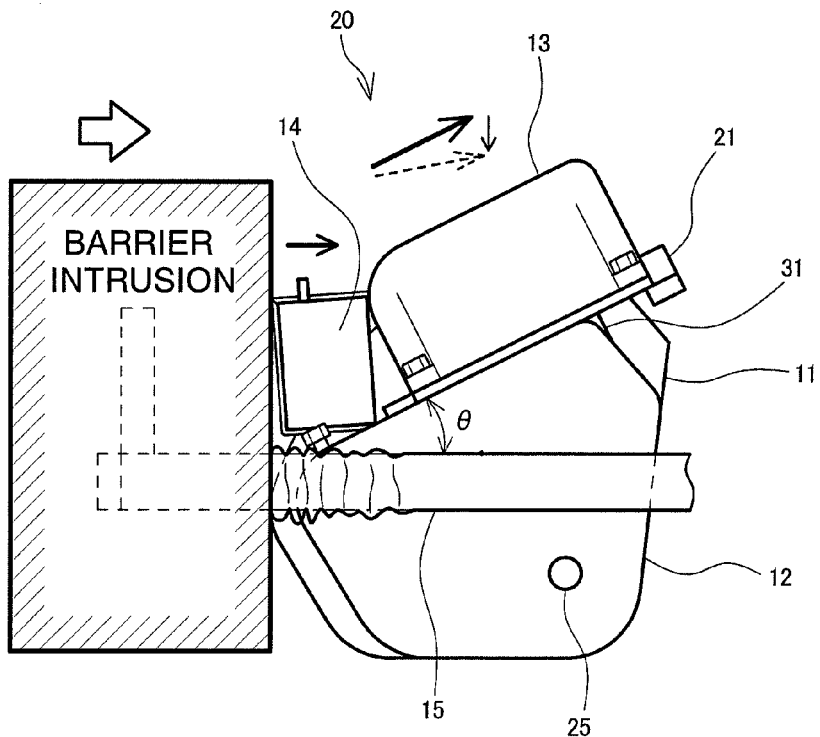

FIG. 3 is a side view illustrating a deformation of the engine compartment 20 illustrated in FIG. 1 when a barrier intrudes into the engine compartment 20 from the vehicle's front side. FIG. 3(A) illustrates the vehicular instrument-mounting structure including the auxiliary battery 14 and the PCU 13 of the engine compartment 20 before collision, and FIG. 3(B) illustrates the vehicular instrument-mounting structure with a displacement of the auxiliary battery 14 caused when the barrier intrudes into the engine compartment 20 and with a displacement of the PCU 13 which is pushed up with the displacement of the auxiliary battery 14.

In the engine compartment illustrated in FIG. 3(A), the side members 15, the front cross member 18 which is connected to the leading ends of the side members 15, the radiator 17 disposed on the front cross member 18, the auxiliary battery 14 which is fixed to the radiator attachment portion via the support platform 23 and the securing piece 22, the engine 11 and the motor case 12, the axle 25 extending from the motor case 12, the guide plate 19 which is disengageably placed on the motor case 12 at an angle of elevation θ, the PCU 13 fixed to the guide plate 19 and the female connector 31 attached to the motor case 12, and a male connector 21 which is attached to the PCU 13 and is to be engaged with the female connector 31, are arranged.

Now, with reference to FIG. 3(B), impact load absorption will be generally discussed. In the engine compartment illustrated in FIG. 3(B), with the intrusion of the barrier, the auxiliary battery 14 is squeezed in the horizontal direction, and with such squeezing of the auxiliary battery 14, the PCU 13 ascends a slope having an angle of elevation θ so that impact load absorption due to gravity occurs. At this time, the impact load is absorbed by means of a difference between a vertical component and a gravity component of the elevation angle θ, a frictional resistance by the guide plate, and impact load absorption caused by crushing of the front cross member 18 and the side members 15, and is reduced. Next, the structure of the guide plate 19 will be described in detail.

Figure 4:
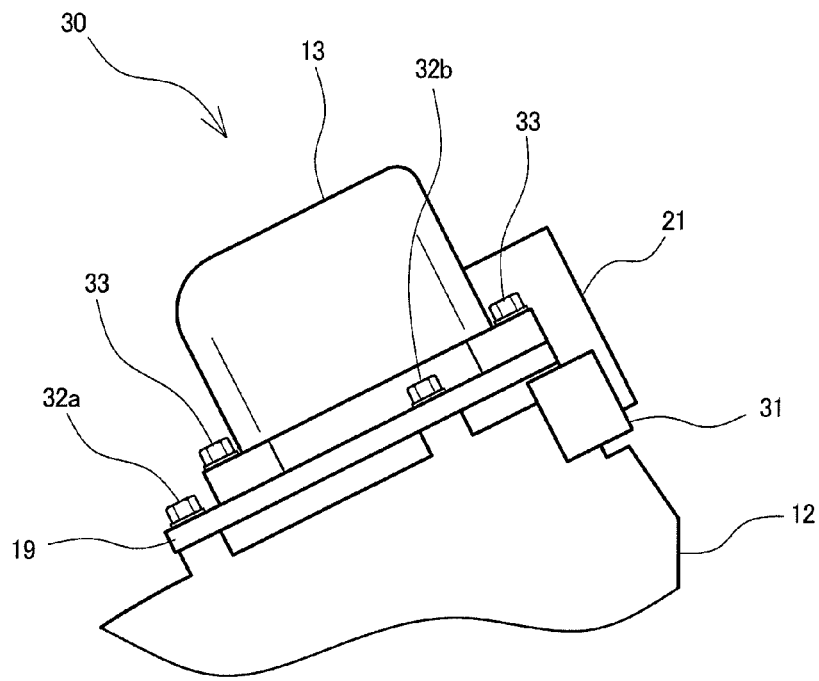
FIG. 4
Explanatory views for explaining a disengagement structure of a PCU in the vehicular instrument-mounting structure according to the embodiment of the present invention.
Figure 4:
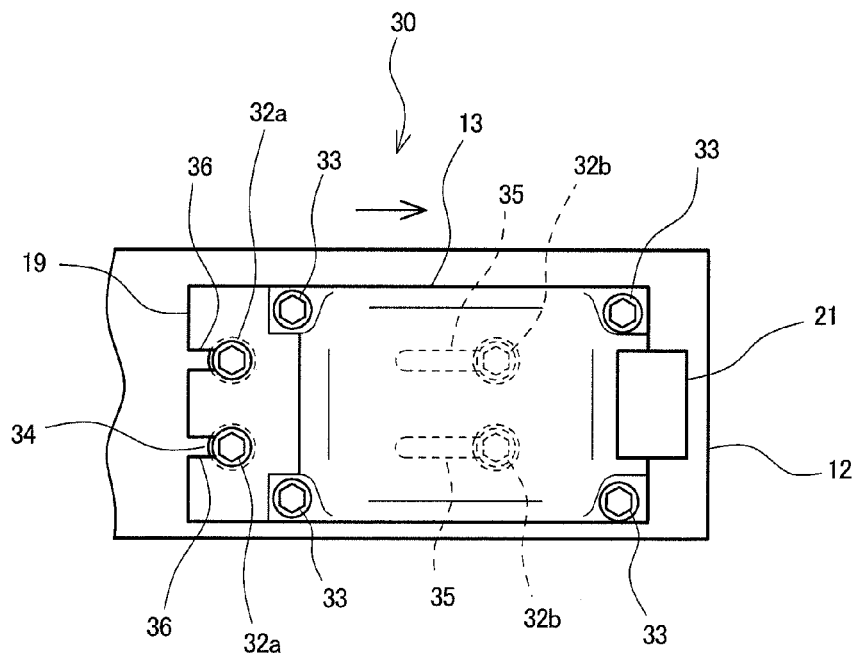
Figure 5:
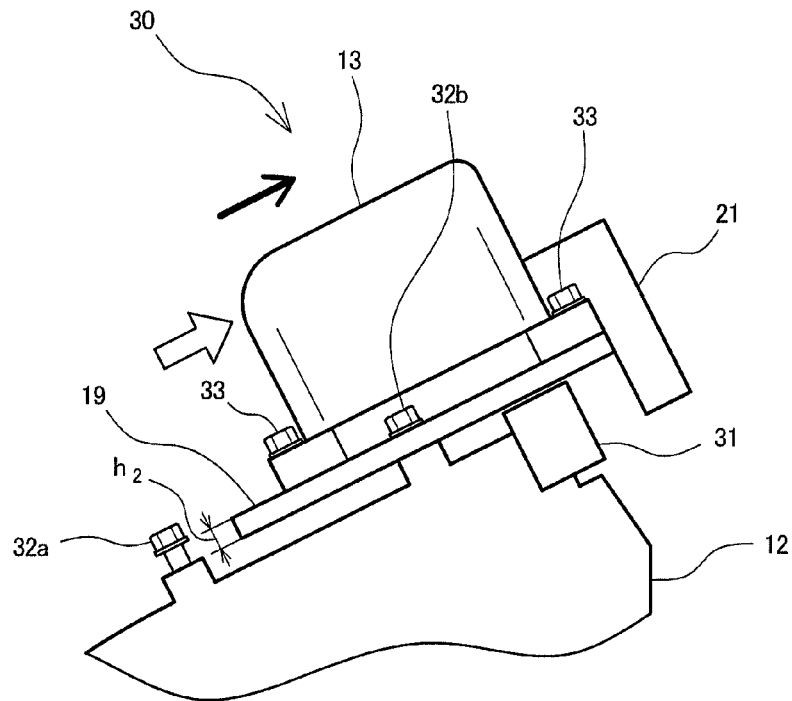
FIG. 5
Explanatory views for explaining a state in which the PCU is disengaged in the vehicular instrument-mounting structure illustrated in FIG. 4.
Figure 5:
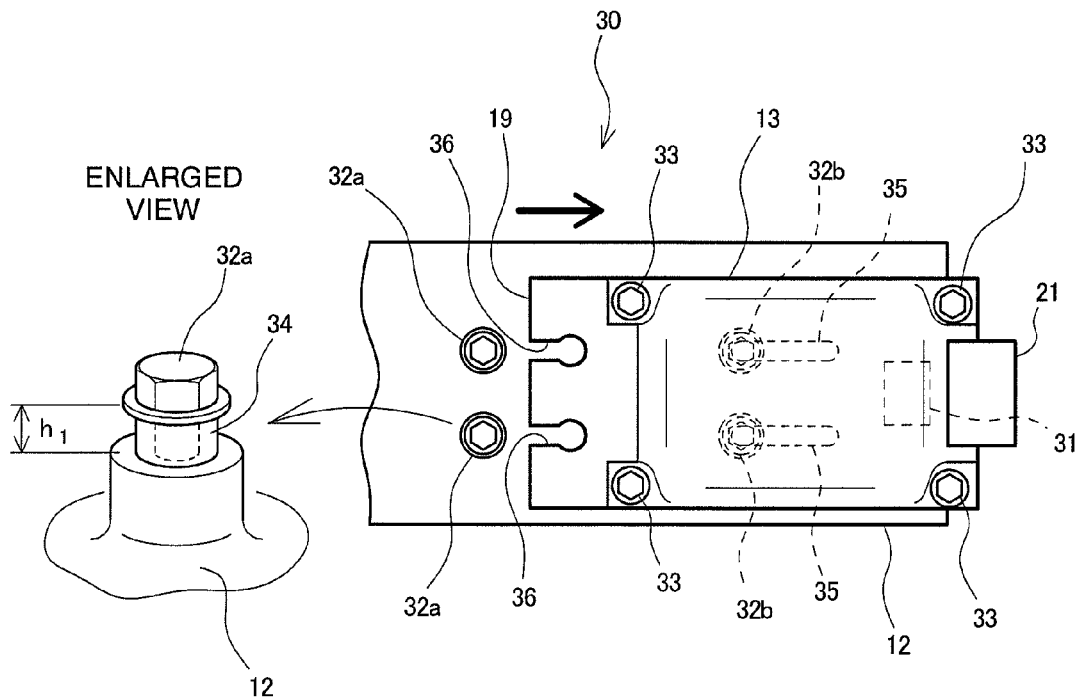

FIG. 4 illustrates a PCU disengagement structure 30 in the vehicular instrument-mounting structure, and FIG. 5 illustrates a state in which the PCU 13 is disengaged. The PCU disengagement structure 30 illustrated in FIG. 4(A) includes the guide plate 19 attached to the motor case 12 with linkage bolts 32*a* and 32*b*, the PCU 13 attached to the guide plate 19 with securing bolts 33, and the male connector 21 and the female connector 31. Here, description of the structure which has been already described will be omitted.

FIG. 4(B) illustrates a top view of the PCU disengagement structure 30, in which the guide plate 19 includes guide holes 35 having a long hole shape and fuse holes 36 having a short hole shape in order to allow disengagement only in the direction of the arrow. The linkage bolts (32a and) 32b attached to the fuse holes 36 and the guide holes 35 have two roles. The first role is a fuse-like role in which when the impact load applied in the direction of arrow in the figure exceeds the fastening force of the linkage bolts 32a and 32b in the fuse holes 36 and the guide holes 35, the linkage bolt 32a in the fuse hole 36 is released from the fastening of the guide plate 19 to cause the guide plate 19 to start disengaging. The second role is a guiding role in which after the linkage bolt 32a of the fuse hole 36 is removed off, the linkage bolt 32b in the guide hole 35 specifies the moving direction of the guide plate 19 and also specifies the frictional resistance.

FIG. 5(A) illustrates that, after the linkage bolt 32a in the fuse hole 36 is removed, the linkage bolt 32b in the guide hole 35 specifies the moving direction of the guide plate 19, and when the guide plate 19 reaches the end point of the guide hole 35, the linkage bolt 32b in the guide hole 35 restricts further disengagement of the guide plate 19. This restriction distance is properly set based on a relationship of the frictional resistance and the impact load between the guide hole 35 and the linkage bolt 32b.

FIG. 5(B) illustrates a top view of the PCU disengagement structure 30 and illustrates the guide plate 19 and the PCU 13 fixed to the guide plate 19 after disengagement. After the disengagement, the guide plate is supported at three points by the two linkage bolts 32b in the guide holes 35 and the upper surface of the female connector 31. Further, in an enlarged view of the linkage bolt 32a in the fuse hole 36, the linkage bolt 32a having a sleeve 34 with a diameter corresponding to the inner diameter of the fuse hole 36 and a thickness h1 corresponding to the thickness h2 of the guide plate 19 inserted therein is illustrated. Here, the thickness h1 of the sleeve 34 is set to be thinner than the thickness h2 of the guide plate such that a predetermined frictional force is applied to the guide plate 19 when coupled to the guide plate via the linkage bolts 32a and 32b. With such a structure, an appropriate frictional force is applied to the guide plate 19 and also the PCU 13 ascends the slope of an angle of elevation θ, so that impact load absorption in accordance with the weight of the PCU 13 can be applied.

While in the above embodiment, the auxiliary battery is disposed parallel to the PCU toward the front side of the vehicle with respect to the PCU, an embodiment in which the auxiliary battery is disposed diagonally depending on the restriction of the space in the engine compartment will be described. By disposing the auxiliary battery at an angle, there is an advantage that the auxiliary battery diagonally pushes the corner portion of the PCU having a relatively high strength, so that the auxiliary battery can turn to make the PCU less deformed and also the distance of squeezing can be reduced.

Figure 6:
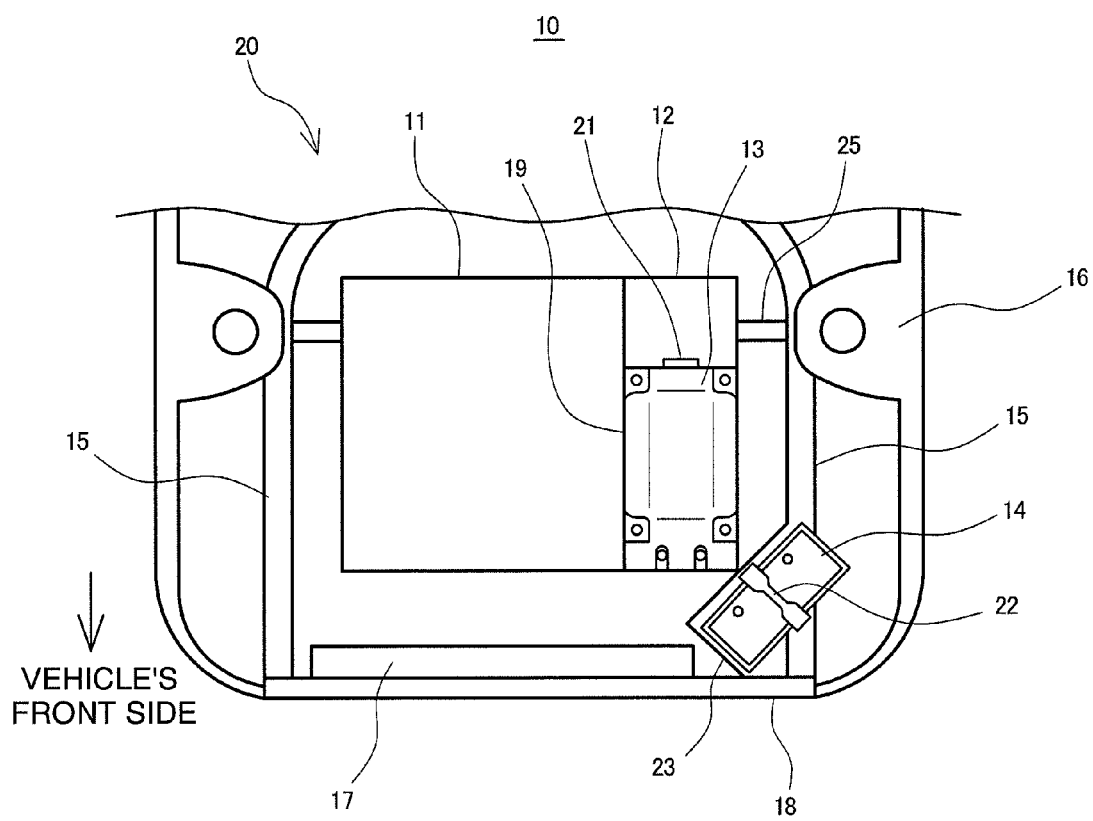
FIG. 6
Explanatory view for explaining another embodiment in which the position of the auxiliary battery is modified with respect to the vehicular instrument-mounting structure illustrated in FIG. 1.
Figure 7:
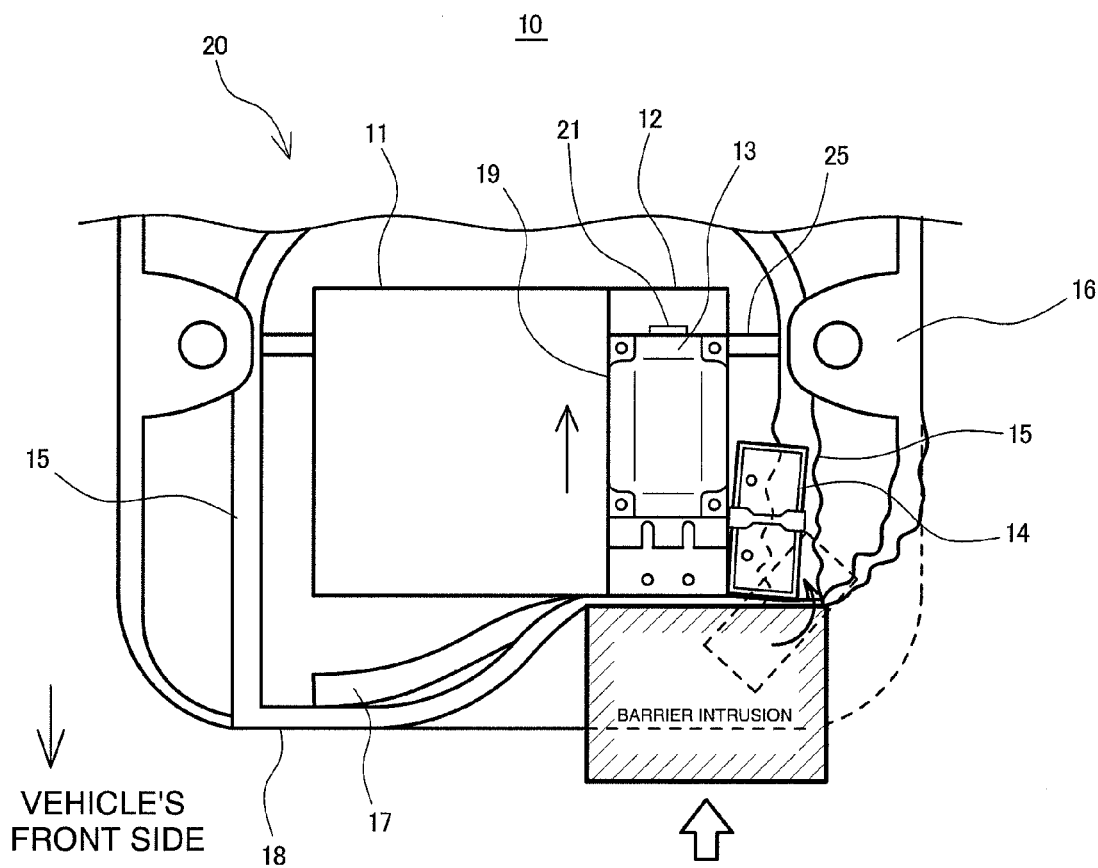
FIG. 7
Top view illustrating, from above, a deformation of the engine compartment illustrated in FIG. 6, when a barrier intrudes from the vehicle's front side.
Figure 8:
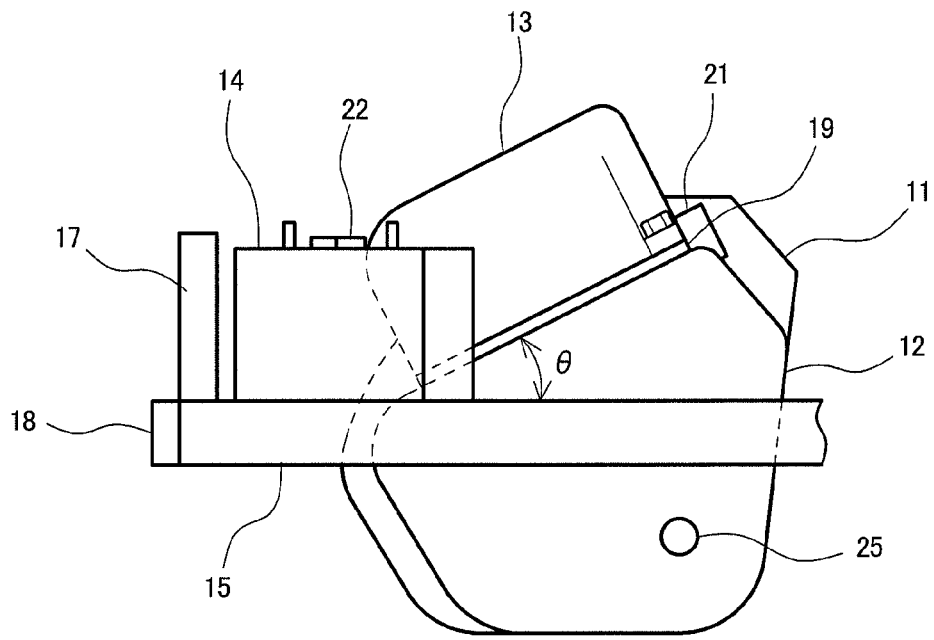
FIG. 8
Side views illustrating, from a lateral side, a deformation of the engine compartment illustrated in FIG. 6, when a barrier intrudes from the vehicle's front side.
Figure 8:
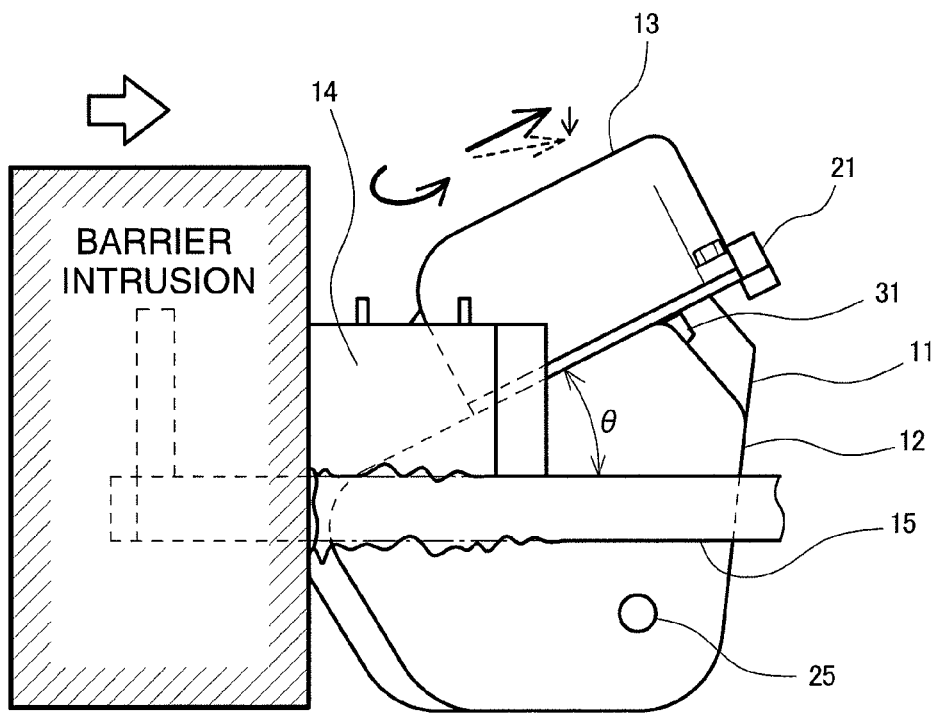

FIG. 6 illustrates another embodiment in which the arrangement of the auxiliary battery 14 is modified with respect to the vehicular instrument-mounting structure illustrated in FIG. 1. FIG. 7 is a top view illustrating a deformation of the engine compartment when a barrier intrudes into the engine compartment from the vehicle's front side, and FIG. 8 is a side view illustrating a deformation of the engine compartment when a barrier intrudes into the engine compartment from the vehicle's front side. With reference to FIGS. 6 to 8, the safety processing against collision with a barrier will be described in detail in four separate stages. Here, description of the structure which has been already described will be omitted.

As illustrated in FIGS. 7 and 8(A), the first stage is a stage of initial collision, in which the barrier comes in contact with the front cross member 18, and the radiator 17 and a corner portion of the auxiliary battery 14 attached to the support platform 23 with the securing piece are pushed into the engine compartment 20 by the barrier.

The second stage is an impact absorption start stage, in which the front cross member 18 which is squeezed by the barrier transmits the impact load to the side member 15, and the side member 15 and peripheral members of the side member 15 are crushed to thereby absorb the impact load. Further, the auxiliary battery turns its orientation while squeezing the PCU 13 in accordance with the crush of the side member as illustrated in FIG. 7.

The third stage is a disengagement stage of the PCU 13 when the barrier further intrudes. As illustrated in FIG. 8(B), a portion of the auxiliary battery 14 which is squeezed by the barrier comes into contact with a corner portion on the front surface of the PCU 13, and then, linkage of the linkage means that couples the PCU 13 with the motor case 12 is released. With the squeezing of the auxiliary battery 14, the PCU 13 is allowed to ascend a slope having an elevation angle of θ so that impact load absorption by means of gravity is generated to cause the PCU 13 to disengage and withdraw toward the backward side of the vehicle.

In the fourth stage, for the safety processing of the PCU 13 after disengagement, the PCU 13 discharges the electric charge of the boost converter, the smoothing capacitor and the like by using the internal circuit of the inverter, thereby securing safety.

As described above, with the application of the vehicular instrument-mounting structure according to the present embodiment, while the auxiliary battery is mounted in a space formed toward the forward side with respect to the transaxle which is secured by mounting the power control device on the transaxle, the reaction force generated by pushing the motor case with the auxiliary battery can be absorbed by disengaging the power control device at the time of collision. It is therefore possible to discharge the electric charge of high voltage speedily by using a circuit within the power control device.

Further, because with the vehicular instrument-mounting structure according to the present embodiment it is possible to eliminate the disadvantages caused by collision even when the auxiliary battery is placed toward the vehicle's front side with respect to the power control device, a high degree of freedom in the layout of the engine compartment can be achieved, so that in vehicles of various sizes and various types, realization of both mounting of the auxiliary battery within the engine compartment and collision safety and also realization of both cost reduction and collision security can be established.

REFERENCE SIGNS LIST 10 hybrid vehicle, 11 engine, 12 motor case, 13 PCU, 14 auxiliary battery, 15 side member, 16 spring support, 17 radiator, 18 front cross member, 19 guide plate, 20 engine compartment, 21 male connector, 22 securing piece, 23 support platform, 25 axle, 30 PCU disengagement structure, 31 female connector, 32a, 32b linkage bolt, 33 securing bolt, 34 sleeve, 35 guide hole, 36 fuse hole

The invention claimed is:

1. A vehicular instrument-mounting structure, in which, in a section formed towards a forward side with respect to a vehicle interior, a motor case that stores therein an electric rotating machine for driving a vehicle is disposed, and a power control device, which performs control of the electric rotating machine is connected, by a cable, to a main battery that supplies electric power for driving a vehicle, and an auxiliary battery, which supplies electric power to a control section of the power control device, are mounted, the vehicular instrument-mounting structure, comprising:

a base plate on which the power control device is mounted, the base plate directly mounted to the motor case and including a guide hole extending in a front-rear direction of the vehicle; and a linkage member for coupling the base plate with an upper surface of the motor case through the guide hole, wherein the guide hole specifies a distance in which the power control device is guided toward a rear side of the vehicle, the linkage member releases linkage between the motor case and the base plate when an impact load is applied to the power control device and restricts the movement of the power control device toward the rear side of the vehicle by abutting an end of the guide hole on a front side of the vehicle, the auxiliary battery is disposed toward the front side of the vehicle with respect to the power control device, and is supported such that the auxiliary battery pushes the power control device movably toward the rear side of the vehicle while the auxiliary battery is moved toward the rear side of the vehicle due to the impact load, and the cable has an extra length which is longer than a length of the guide hole in the front-rear direction of the vehicle, thereby maintaining connection with the power control device when the power control device moves toward the rear side of the vehicle.

2. The vehicular instrument-mounting structure according to claim 1, wherein an upper surface of the motor case is formed such that the upper surface on the front side of the vehicle is located lower than the upper surface on the rear side of the vehicle, and during the movement of the power control device, a friction resistance and a resistive load in a gravity direction are generated between the upper surface of the motor case and the base plate.

3. The vehicular instrument-mounting structure according to claim 2, wherein the auxiliary battery is placed at an angle with respect to the front-rear direction of the vehicle; and the auxiliary battery is disposed such that a rear-most end portion of the auxiliary battery is located toward a rear side of the vehicle with respect to a front-most end portion of the power control device.

4. The vehicular instrument-mounting structure according to claim 2, wherein the auxiliary battery is disposed such that a portion of the auxiliary battery is located toward a lateral side with respect to the power control device.

5. The vehicular instrument-mounting structure according to claim 1, wherein a direction of the movement of the power control device is specified to one direction by the guide hole and the linkage member.

6. The vehicular instrument-mounting structure according to claim 1, wherein the motor case is a twin-shaft trans-axle having two electrical rotary machines.

* * * * *